United States Patent
Huang et al.

(10) Patent No.: US 8,878,897 B2
(45) Date of Patent: Nov. 4, 2014

(54) SYSTEMS AND METHODS FOR SHARING CONVERSION DATA

(75) Inventors: Man-Chen Huang, Kaohsiung (TW);
Yen-Po Tseng, Taipei (TW);
Liang-Heng Chen, Tainan (TW);
Kun-Tse Wu, Taipei (TW); Yi-Chiun Hong, Danshui Township, Taipei County (TW); En-Jan Chou, Yongkang (TW)

(73) Assignee: Cyberlink Corp., Shindian, Taipei (TW)

( * ) Notice: Subject to any disclaimer, the term of this patent is extended or adjusted under 35 U.S.C. 154(b) by 611 days.

(21) Appl. No.: 12/975,505

(22) Filed: Dec. 22, 2010

(65) Prior Publication Data
US 2012/0162363 A1 Jun. 28, 2012

(51) Int. Cl.
*H04N 13/00* (2006.01)
*H04N 13/02* (2006.01)
*H04N 21/00* (2011.01)
*H04N 21/4402* (2011.01)
*H04N 21/81* (2011.01)
*H04N 21/658* (2011.01)

(52) U.S. Cl.
CPC ......... *H04N 13/026* (2013.01); *H04N 13/0271* (2013.01); *H04N 21/00* (2013.01); *H04N 13/0207* (2013.01); *H04N 13/0275* (2013.01); *H04N 21/440218* (2013.01); *H04N 21/6582* (2013.01); *H04N 21/816* (2013.01)
USPC .................. 348/43; 348/42; 348/46; 348/51

(58) Field of Classification Search
CPC ............ H04N 13/026; H04N 13/0275; H04N 13/0271; H04N 13/0207; H04N 21/00; H04N 21/6582; H04N 21/816
USPC ......................................... 348/42, 43, 46, 51
See application file for complete search history.

(56) References Cited

U.S. PATENT DOCUMENTS

| 6,834,312 | B2* | 12/2004 | Edwards et al. ............... 709/246 |
| 7,319,720 | B2* | 1/2008 | Abrams, Jr. ............... 375/240.12 |
| 2006/0221178 | A1* | 10/2006 | Yun et al. ........................ 348/42 |
| 2008/0246759 | A1 | 10/2008 | Summers | |
| 2009/0315980 | A1 | 12/2009 | Jung et al. | |

* cited by examiner

*Primary Examiner* — Geepy Pe
(74) *Attorney, Agent, or Firm* — McClure, Qualey & Rodack, LLP

(57) ABSTRACT

A method implemented in a server for sharing video conversion data includes receiving conversion data for a two-dimensional (2D) video and archiving the conversion data. A selection of a 2D video corresponding to the archived conversion data is received from a client, and conversion data corresponding to the selection received from the client is transmitted to the client.

32 Claims, 10 Drawing Sheets

SYSTEMS AND METHODS FOR SHARING CONVERSION DATA

TECHNICAL FIELD

The present disclosure generally relates to video processing and particularly, to the sharing of conversion data.

BACKGROUND

Three dimensional (3D) video systems are designed to duplicate real-world experience by providing each eye a unique version of the video. By displaying a separate image for each eye, a 3D image is created. Objects in a 3D video may appear to be in front of or behind the screen. To view 3D video, the display technology and the corresponding 3D glasses insure that the left eye sees only the video meant for the left eye, and so on for the right eye. There are a number of different technologies that are designed to accomplish this, and each technology has its own benefits, drawbacks and costs. As 3D video gains increasing popularity, more tools are becoming available for converting existing two-dimensional (2D) video into 3D videos. One perceived shortcoming, however, is that users are limited to viewing the newly-created 3D video on their own display. Another perceived shortcoming is the degree of time and complexity involved in performing the conversion process using available tools.

SUMMARY

Briefly described, one embodiment, among others, is a method, executed by a conversion data server, for sharing video conversion data. The method comprises receiving, by the conversion data server, conversion data from a first remote client for a two-dimensional (2D) video, wherein the conversion data is generated by a video converter of the first remote client. The method further comprises archiving the conversion data at the conversion data server, and responsive to a second remote client selecting the same 2D video to be converted to a stereoscopic video, transmitting to the second remote client one of: the conversion data and the stereoscopic video, wherein the conversion data is used to produce the stereoscopic video based on the 2D video and the conversion data.

Another embodiment is a method implemented in a server for sharing video conversion data. The method comprises receiving one or more sets of conversion data for one or more two-dimensional (2D) videos, archiving the one or more sets of conversion data, and receiving, from a client, a selection of a 2D video corresponding to one or more of the archived one or more conversion data. The method further comprises transmitting, to the client, conversion data corresponding to the selection received from the client.

Another embodiment is a system for sharing conversion data. The system comprises a conversion data server that comprises a data share application stored on a storage medium and executable in the conversion data server that responds to a selection of a two-dimensional (2D) video, the data share application comprising a user interface generator configured to generate a user interface for receiving the selection of the 2D video from a client. The conversion data server also comprises a storage device for storing conversion data corresponding to the 2D video, wherein the conversion data comprises data for conversion of the 2D video to a three-dimensional (3D) video.

Another embodiment is a method for generating a stereoscopic video. The method comprises generating, by a remote video converter of a first remote client, conversion data for a two-dimensional (2D) video, wherein the video converter of the first remote client receives streaming 2D video from a video sharing server. The method further comprises receiving, by a conversion data server, a selection from a second remote client. In response to the second remote client making a selection corresponding to the same 2D video, the 2D video is combined with the conversion data to generate a 3D video, wherein combining the 2D video with the conversion data is performed at one of: the conversion data server and the second remote client.

Another embodiment is a method for generating a stereoscopic video. The method comprises generating, by a remote video converter of a first remote client, conversion data for conversion of a two-dimensional (2D) video to the stereoscopic video, wherein the video converter of the first remote client receives streaming 2D video from a video sharing server. The method further comprises transmitting the generated conversion data to a conversion data server configured to receive selections from a second remote client.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
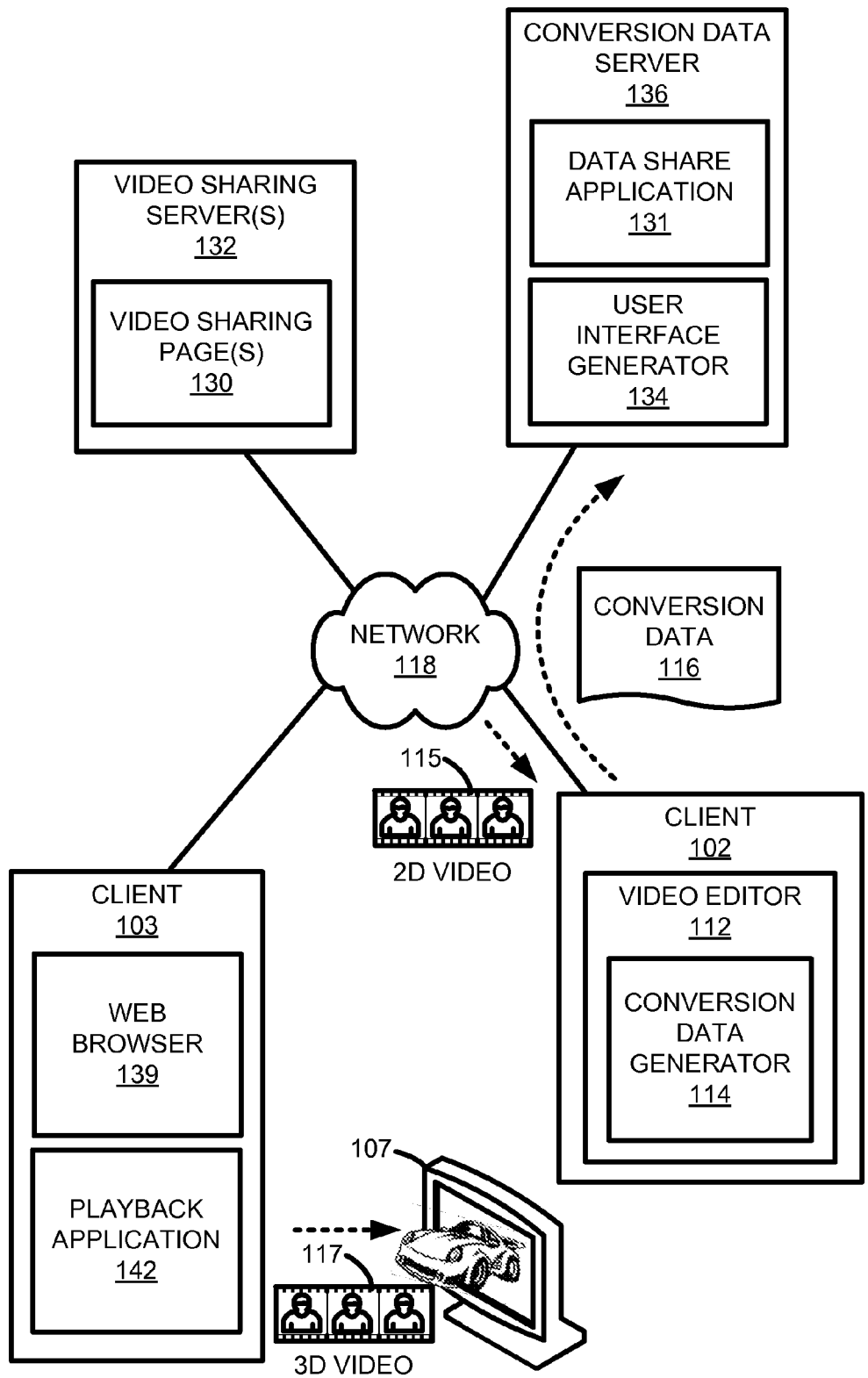
FIG. 1 depicts a top-level diagram of a networked system for sharing conversion data.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed earlier, one perceived shortcoming with conventional three dimensional (3D) converters is that users are limited to viewing the newly-created 3D video on their own display. Another perceived shortcoming is the degree of time and complexity involved in performing the conversion process using available video editing solutions. By utilizing the systems and methods disclosed herein, users can convert two-dimensional (2D) video to 3D video and publish the conversion data associated with the 2D-to-3D conversion. Other users can then utilize the conversion data to re-create the same 3D video, thereby avoiding the need to undergo the repetitive conversion process. The 3D video is generated by combining the conversion data with the original 2D video. For purposes of this disclosure, the terms "3D" and "stereoscopic" may be used interchangeably.

A description of a system for sharing conversion data is now described followed by a discussion of the operation of the components within the system. FIG. 1 depicts a top-level diagram of a networked system for sharing conversion data. A first client 102 is shown that may be embodied, for example, as a desktop computer, computer workstation, laptop, or other computing platform. In other embodiments, the first client 102 may be embodied as a video gaming console (not shown), which includes a video game controller for receiving user preferences. For such embodiments, the video gaming console may be connected to a television or other display.

The first client 102 comprises a video editor 112, which comprises a conversion data generator 114. Also shown is a conversion data server 136 configured to receive conversion data 116 generated by the first client 102. The conversion data server 136 includes a data share application 131 and a user interface generator 134. The data share application 131 interfaces with a remote client 103 and transmits archived conversion data 116. The user interface generator 134 in the conversion data server 136 provides a user interface, which may be embodied, for example, as a web page viewed on a web browser 139 on the remote client 103 via a display 107.

In accordance with some embodiments, the first client 102 comprises a video converter (not shown) for receiving a 2D video 115 to be converted into a 3D video 117. The 2D video 115 may be received via a network 118 from one or more video sharing servers 132 such as, for example, YouTube® and other content providers. Generally, the video sharing server 132 will include one or more video sharing pages 130 rendered on the first client 102. This allows a user at the first client 102 to select and receive a 2D video 115. The user may convert the 2D video 115 into a 3D video 117 by the conversion data generator 114, which is a 2D-to-3D converter. The user may also incorporate special effects into the received 2D video using the video editor 112. Based on this conversion process, conversion data 116 is generated by the conversion data generator 114.

The conversion data 116 is uploaded to the conversion data server 136 to be archived. For some embodiments, storage location data associated with the converted 2D video 115 is also uploaded to the conversion data server 136 to be archived. This allows a copy of the 2D video 115 to later be retrieved by the remote client 103. A user at the remote client 103 makes a selection using the user interface provided by the user interface generator 134 located at the conversion data server 136. As shown, the video sharing server 132, the first client 102, the conversion data server 136, and the remote client 103 may be coupled together via a network 118 such as the Internet. Once the user at the remote client 103 selects a 2D video 115 among one or more 2D videos which have associated conversion data 116 stored on the conversion data server, the conversion data server 136 sends the corresponding conversion data 116.

The remote client 103 receives the conversion data 116 and combines the conversion data 116 with the 2D video 115 to generate a 3D video 117. (The conversion data 116 may also be combined with the 2D video in the server before being transmitted to the client). The conversion data 116 specifies depth information for regions within frames of the 2D video 115. Such regions may be defined by pixels or may comprise a predetermined area within the frame. To utilize the previous-generated conversion data 116, 3D depth information specified in the conversion data 116 is applied to video frames of the 2D video 115, thereby bypassing the need to undergo the complex calculation process involved in 2D-to-3D conversion. Thus, the use of previously-generated conversion data 116 to generate 3D video 117 may be implemented on lower-end platforms as the demand for computational resources is not as high. Furthermore, in accordance with some embodiments, a user may modify previously-generated conversion data 116 to enhance the quality of the 3D video 117 or to incorporate 3D special effects. The playback application 142 in the remote client 103 outputs the 3D video 117 to the display 107.

Figure 2:
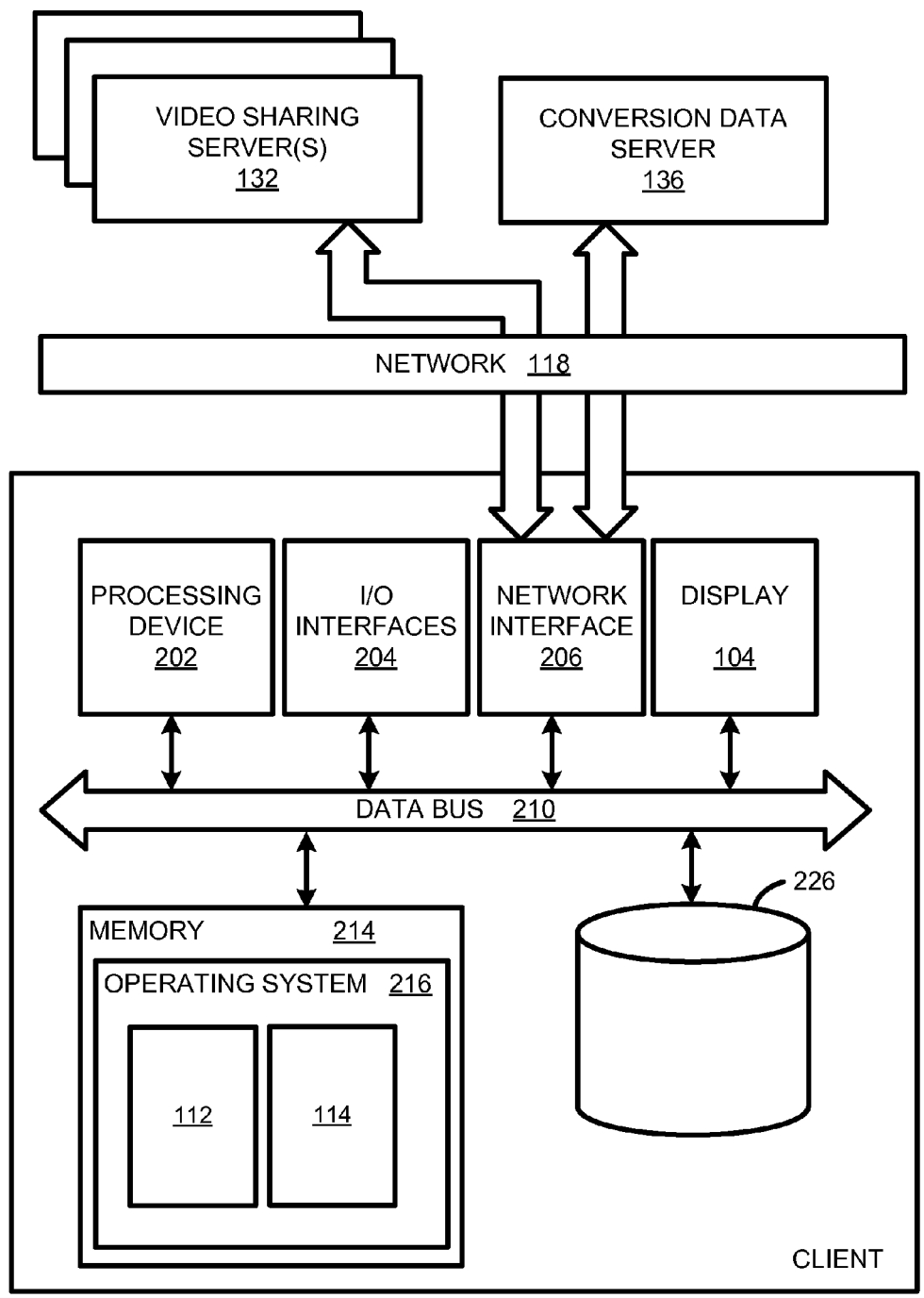
FIG. 2 illustrates additional components of the clients in FIG. 1.

FIG. 2 illustrates an embodiment of the clients 102, 103 shown in FIG. 1. The clients 102, 103 may be embodied in any one of a wide variety of wired and/or wireless computing devices, such as a desktop computer, portable computer, dedicated server computer, multiprocessor computing device, smartphone, personal digital assistant (PDA), digital camera, and so forth. As shown in FIG. 2, the clients 102, 103 comprise memory 214, a processing device 202, a number of input/output interfaces 204, a network interface 206, a display 104, and mass storage 226, wherein each of these devices are connected across a local data bus 210.

The processing device 202 may include any custom made or commercially available processor, a central processing unit (CPU) or an auxiliary processor among several processors associated with the clients 102, 103, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components 112, 114 of the clients 102, 103 depicted in FIG. 1. In accordance with such embodiments, the components are stored in memory 214 and executed by the processing device 202. As described earlier, the first client 102 comprises a video converter, which may also be embodied as application specific software stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the clients 102, 103 each comprise a personal computer, these components may interface with one or more user input/output devices 204, which may comprise a keyboard or a mouse, as shown in FIG. 2. The display 104 may comprise a computer monitor, a plasma screen for a PC, a liquid crystal display (LCD) on a hand held device, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
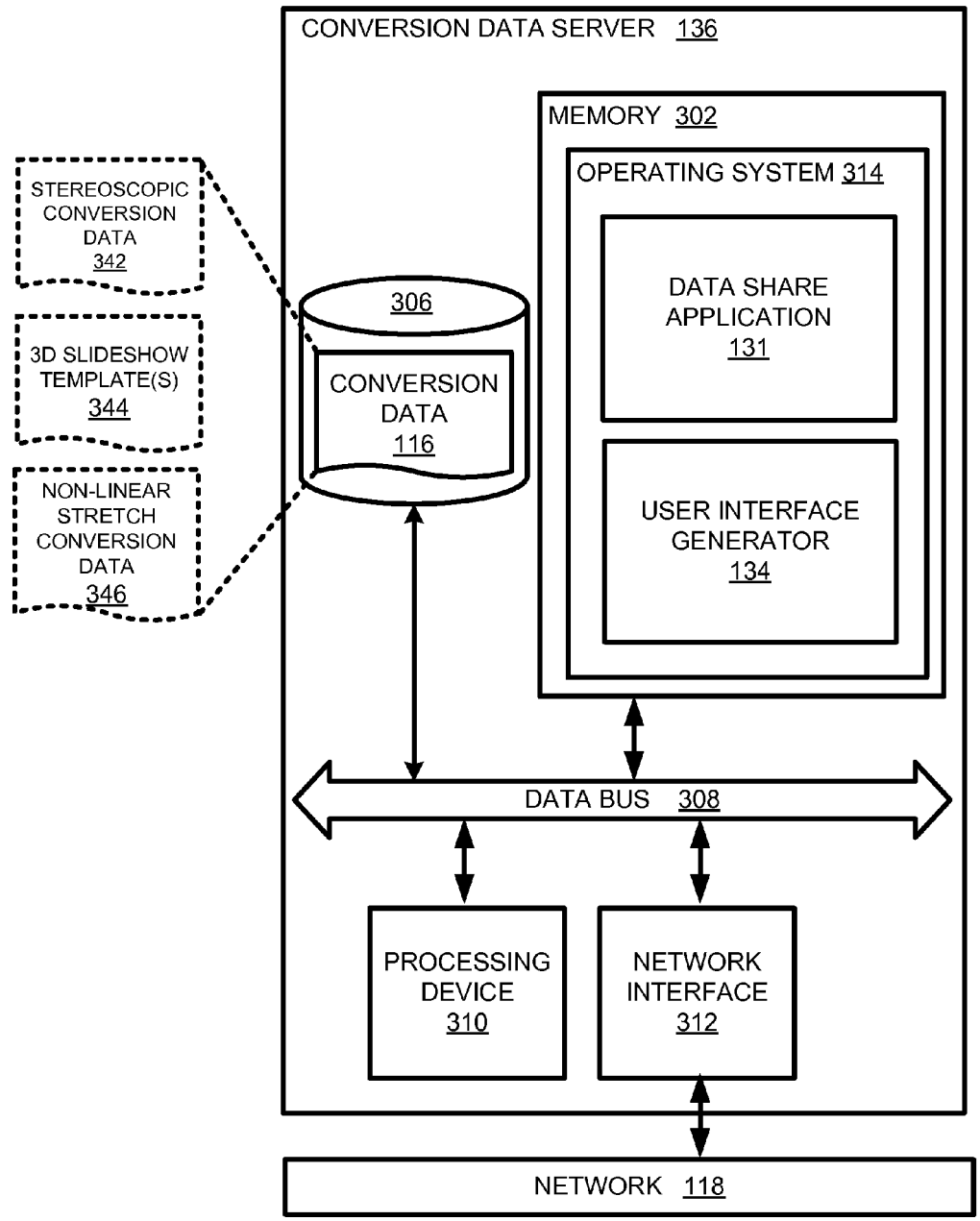
FIG. 3 illustrates additional components of the conversion data server in FIG. 1.

FIG. 3 illustrates an embodiment of the conversion data server 136 shown in FIG. 1. As with the clients 102, 103, the conversion data server 136 may be embodied in any one of a wide variety of wired and/or wireless computing devices, such as a desktop computer, portable computer, dedicated server computer, multiprocessor computing device, smartphone, personal digital assistant (PDA), digital camera, and so forth. Similarly, the conversion data server 136 comprises memory, a processing device 310, a number of input/output interfaces, a network interface 312, a peripheral interface, and mass storage 306, wherein each of these devices are connected across a local data bus 308.

The processing device 310 may include any custom made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 302 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 302 typically comprises a native operating system 314, one or more native applications, emulation systems, or emulated applications for any of a variety of operating systems and/or emulated hardware platforms, emulated operating systems, etc. For example, the applications may include application specific software which may comprise the data share application 131 and the user interface generator 134 of the conversion data server 136 depicted in FIG. 1. In accordance with such embodiments, the components are stored in memory 302 and executed by the processing device 310. One of ordinary skill in the art will appreciate that the memory 302 can, and typically will, comprise other components which have been omitted for purposes of brevity.

Figure 4:
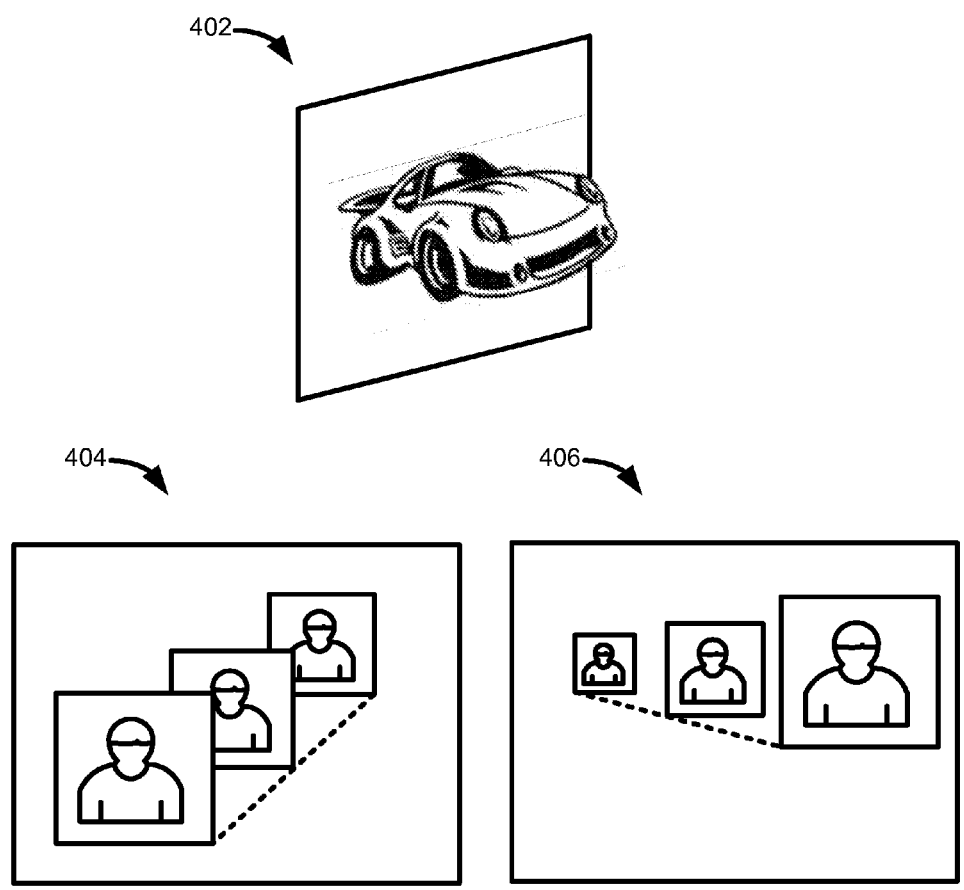
FIG. 4 illustrates various uses of the conversion data stored in the conversion data server of FIG. 1.

As shown, conversion data 116 received by the conversion data server 136 from the first client 102 in FIG. 1 may be archived and stored in mass storage 306. In accordance with some embodiments, the conversion data 116 may comprise a depth map (not shown), stereoscopic conversion data 342, 3D slideshow templates 344, and non-linear stretch conversion data 346, among other types of data related to 2D-to-3D conversion. Referring briefly to FIG. 4, the stereoscopic data 342 is used to perform 3D conversion of a flat, two-dimensional video, as illustrated in the first example 402. For some embodiments, stereoscopic conversion data 342 is generated by the first client 102 in FIG. 1 by identifying objects within the 2D video 115 and determining scene depth information relating to the objects using such techniques as object and/or motion recognition. The 3D slideshow templates 344 comprise conversion data related to 3D special effects for 2D video 115. For example, as shown in examples 404, 406, images may be embedded into frames to create a 3D effect.

The non-linear stretch conversion data 346 is used for converting 2D video 115 to a 3D-compatible format based on non-linear stretch techniques that leverages depth information. Non-linear stretching is utilized when the aspect ratio of the 2D video is different from the aspect ratio of the rendering target to determine sampling information. The techniques described for converting 2D video 115 to 3D video 117 enhance users' viewing experience by reducing object shape distortion that results from mapping one aspect ratio to a second aspect ratio. In accordance with one embodiment for converting 2D video to 3D video based on non-linear stretch techniques, depth information relating to at least one of the samples is determined and the 2D video is sampled, wherein the sampling is performed non-linearly in one direction for sampling information. The 2D video is transformed to a 3D-compatible format according to the sampling and outputting the transformed 2D video to a display device.

In accordance with another embodiment, the client 102 in FIG. 1 comprises a sampling module configured to perform non-linear sampling of the 2D video to determine sampling information, a depth processor configured to determine depth information relating to a frame, and a saliency region identifier configured to identify one or more regions of interest with the frame, wherein the sampling module is further configured to adjust a sampling density for the sampling process based on a saliency region. For some embodiments, depth information is determined by the depth processor by detecting one or more of the following: a vanishing point technique based on lines, sizes of objects, luminance of objects, texture gradient of objects, motion of the objects, a presence of human features, placement of objects, an object's shadow, and occlusive relationships between objects. The client 102 further comprises a graphics renderer for rendering a 3D video according to the sampling density.

In accordance with another embodiment, a method is implemented in the client 102 for converting 2D video to a 3D format. The method comprises determining an order of objects relating in a frame within the 2D video, defining a high saliency region based on the order of the objects, adjusting a sampling density according to the high saliency region, sampling the 2D video according to the adjusted sampling density, transforming the 2D video to a 3D-compatible format according to the sampling, and outputting the transformed 2D video to a display device.

Figure 5:
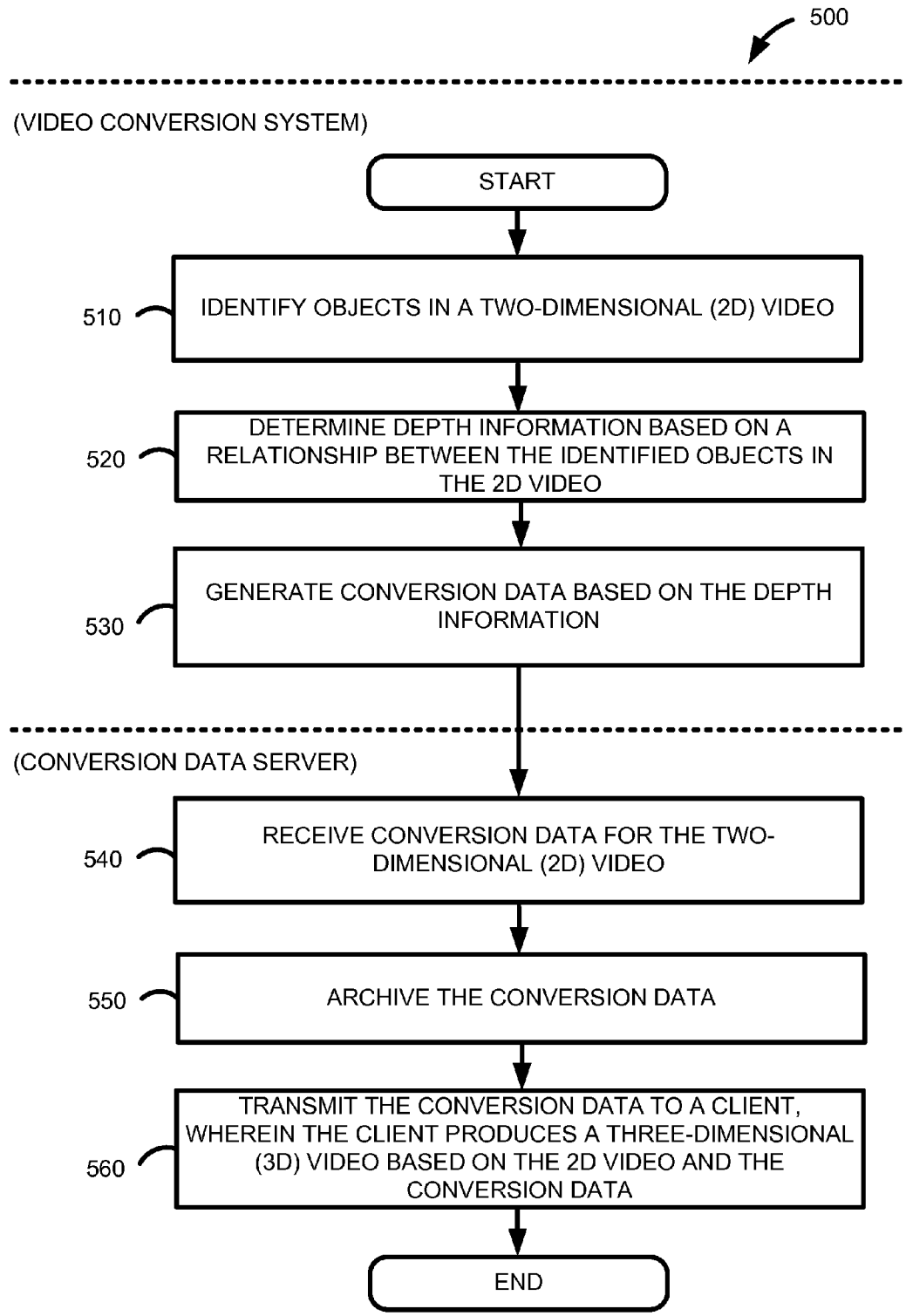
FIG. 5 is a flowchart for a method of sharing conversion data implemented in the components in FIG. 1.

Reference is now made to FIG. 5, which is a flowchart 500 for a method of sharing conversion data implemented in the components in FIG. 1. In particular, the interaction between the first client 102 and the conversion data server 136 is described. If embodied in software, each block depicted in FIG. 5 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Although the flowchart 500 of FIG. 5 shows a specific order of execution, it is understood that the order of execution may differ from that which is depicted. At the first client 102, objects within a 2D video 115 are identified, and depth information based on the relationship between the identified objects in the 2D video 115 is derived (block 520). In block 530, conversion data 116 is generated based on the determined depth information, which is derived during conversion of the 2D video 115 to a 3D video 117. The conversion data 116 is sent by the first client 102 and received by the conversion data server 136 (block 540). The received conversion data 116 is archived (block 550) for future access. Based on one or more selections by a remote client 103, the conversion data server 136 sends the conversion data 116 to the remote client 103 (block 560), where the remote client 103 is able to view the 3D video 117 based on the conversion data 116, thereby avoiding the need for the remote client 103 to re-create conversion data 116.

Figure 6:
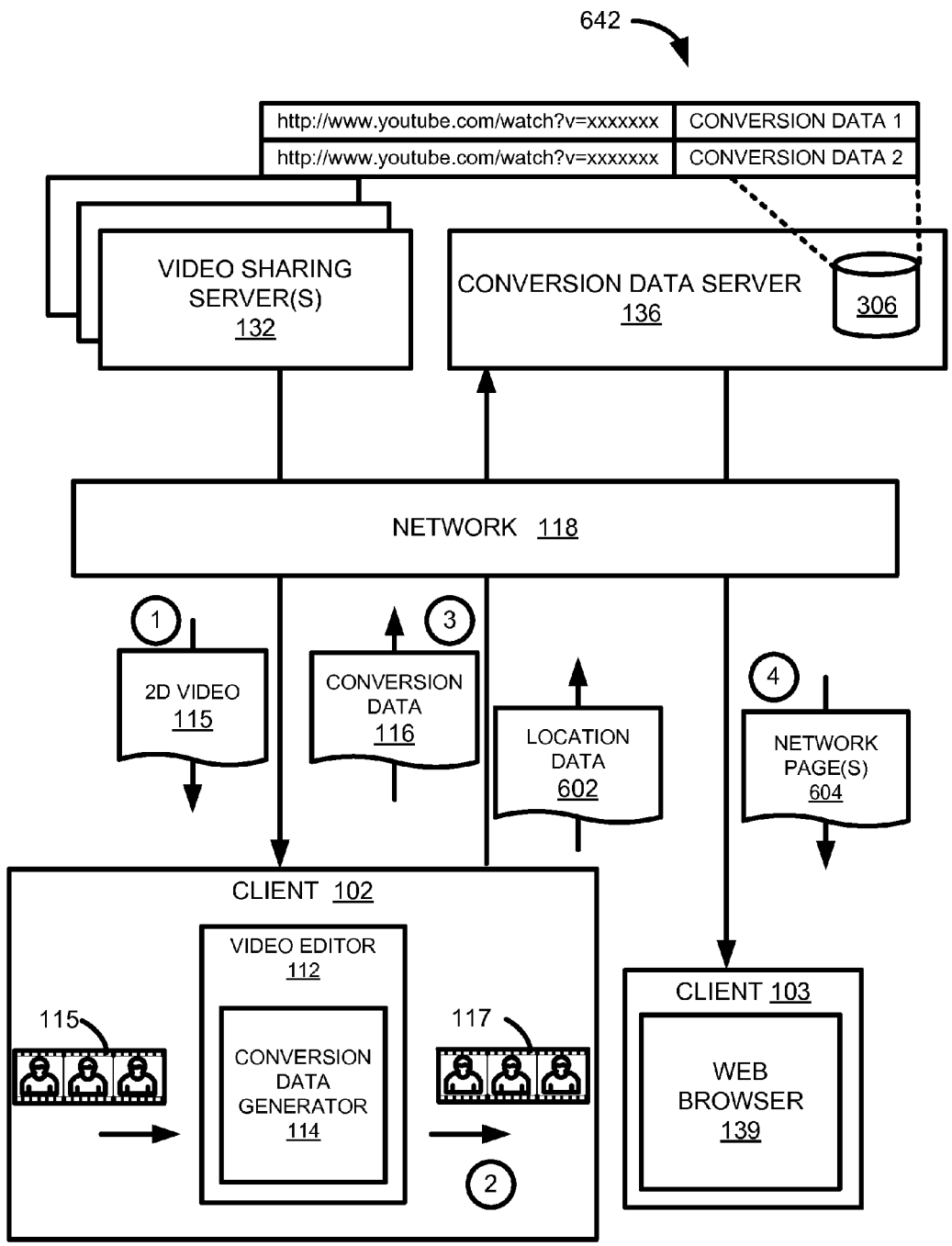
FIGS. 6-8 illustrate the process flow between the various components in the system of FIG. 1.
Figure 7:
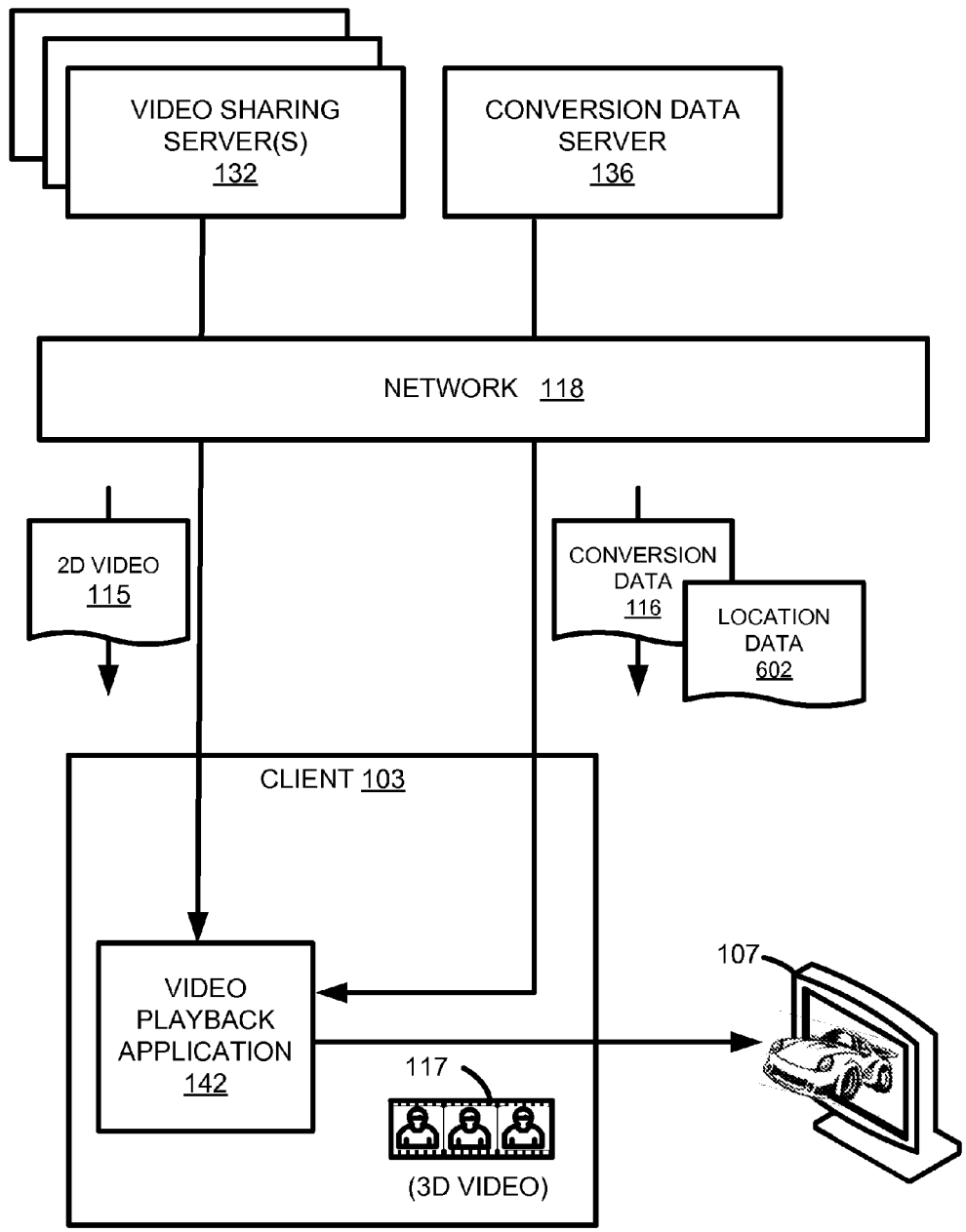
Figure 8:
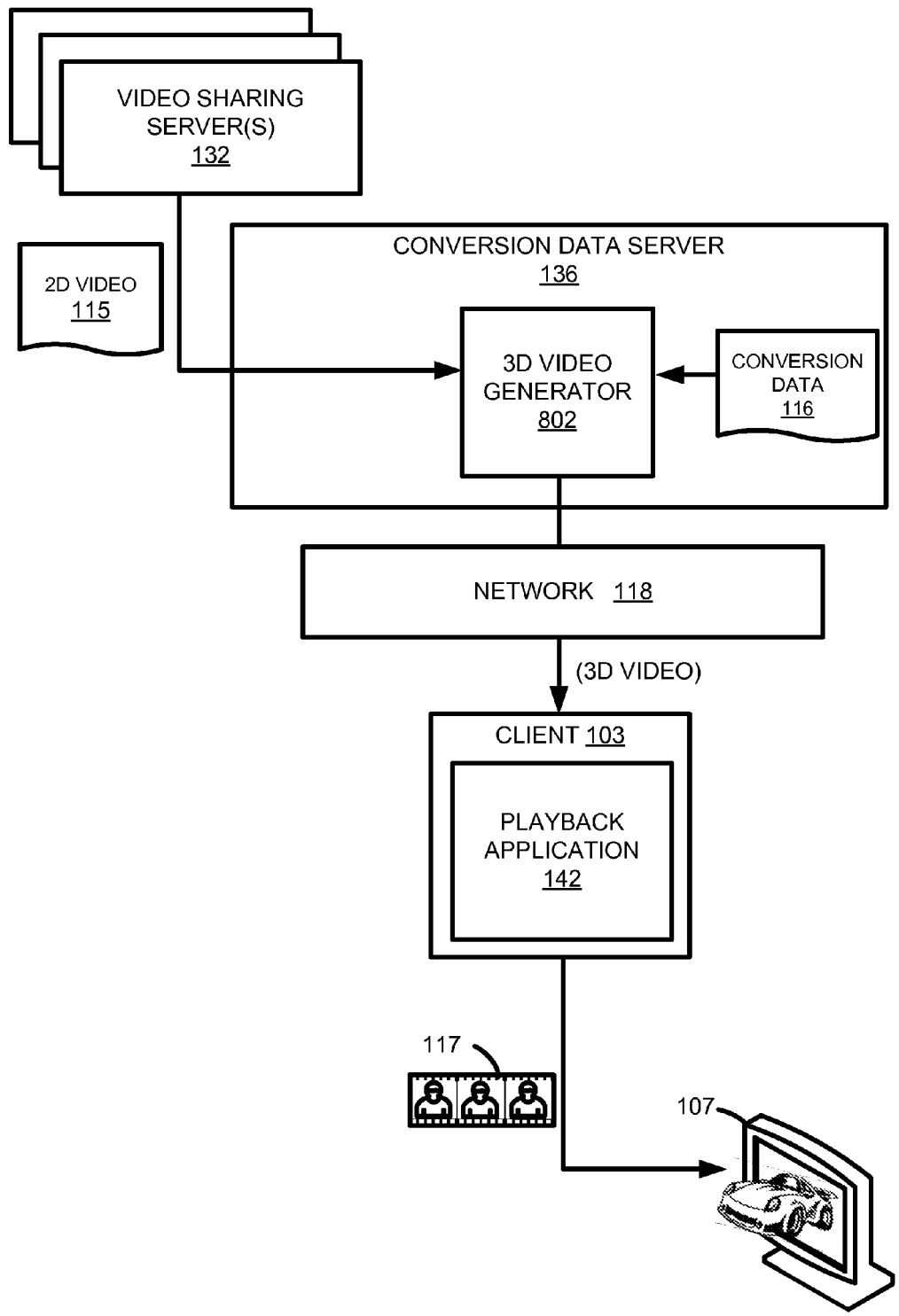

Reference is made to FIGS. 6-8, which further illustrate the process flow between the various components in the system of FIG. 1. The first client 102 receives a 2D video 115 from the video sharing server 132 such as, for example, YouTube® and other content providers. The first client 102 performs a 2D-to-3D conversion. The conversion data 116 created by the conversion data generator 114 is then uploaded to the conversion data server 136. In accordance with some embodiments, storage location data 602 for the 2D video 115 is also uploaded to the conversion data server 136. This storage location data 602 is later used to access the 2D video 115 by the remote client 103. For some embodiments, the conversion data 116 and storage location data 602 may be stored in a mapping table 642 within mass storage 306.

In accordance with some embodiments, the storage location data 602 may comprise a Uniform Resource Identifier (URI) comprising a string of characters used to identify a name or a resource on the Internet. The URI may comprise a Uniform Resource Locator (URL) or an Internet Protocol (IP) address. For example, if the 2D video 115 is being streamed via a peer-to-peer (P2P) configuration, the storage location data 602 may comprise an IP address. The URI specifies where the 2D video 115 is stored, and the corresponding conversion data is stored in an entry within the mapping table 642. Note that each 2D video may have more than one set of conversion data 116. Also, the mapping table 642 may store storage location data 602 and conversion 116 corresponding to other previously-processed 2D videos. The conversion data server 136 provides a user interface to the remote client 103, which a user uses to make one or more video selections. In some embodiments, the user interface is provided by sending one or more network pages 604 to the remote client 103, where the remote client 103 renders the network page(s) on a display 107.

FIGS. 7 and 8 illustrate different embodiments for leveraging the use of conversion data 116 created by the first client 102 so that a remote client 103 avoids having to undergo another 2D-to-3D conversion process. Turning to FIG. 7, the remote client 103 receives the conversion data 116 and location 602 corresponding to the selection made via the user interface provided by the conversion data server 136. Using the storage location data 602, the remote client 103 downloads the 2D video 115 from the video sharing server(s) 132. In accordance with some embodiments, a video playback application 142 in the remote client 103 generates a 3D video 117 by combining the 2D video 115 with the conversion data 116 received from the conversion data server 136. The 3D video 117 is then output to a display 107.

Reference is made to FIG. 8, which shows an alternative embodiment for utilizing the conversion data 116. For some embodiments, a 3D video generator 802 in the conversion data server 136 re-creates the 3D video by combining the 2D video 115 with the conversion data 116. The re-created 3D video 117 is then sent to the remote client 103 where the 3D video 117 is output to a display 107 to be viewed. As shown, 3D video 117 is generated at the conversion data server 136 by combining 2D video 115 received from the video sharing server(s) 132 with the conversion data 116. For some implementations, the conversion data server 136 receives streaming 2D video 115 from the video sharing server(s) 132 and combines the 2D video with the conversion data 116 on-the-fly. In other implementations, the conversion data server 136 buffers a received 2D video 115 before combining the 2D video 115 with the conversion data 116. The 3D video 117 is then sent by the conversion data server 136 over the network 118 to the remote client 103 for playback. The remote client 103 thus avoids undergoing another conversion process.

Figure 9:
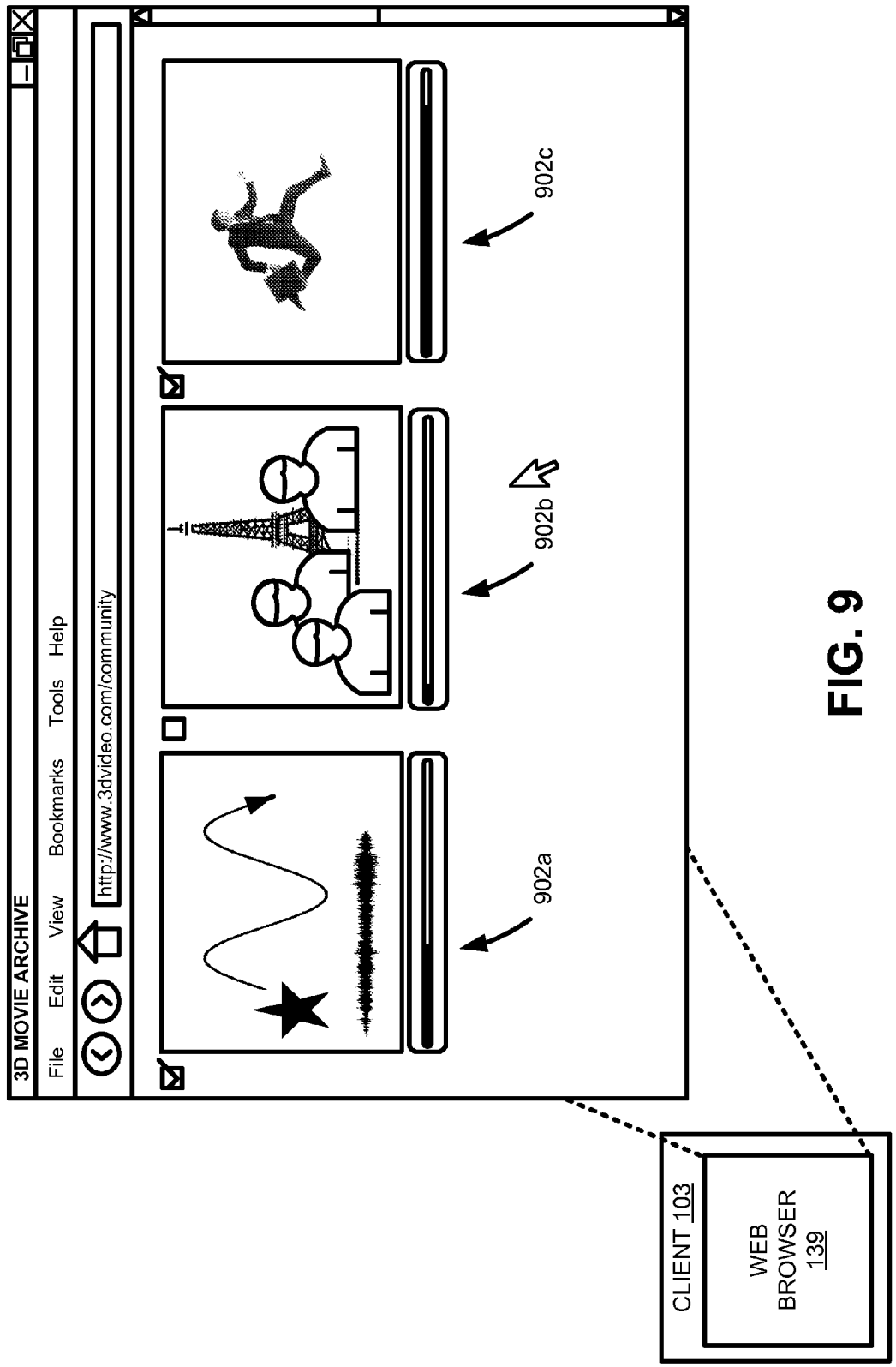
FIG. 9 is an example of a user interface implemented in a navigation page sent by the conversion data server and rendered at the client.

FIG. 9 is an example of a user interface provided in the form of a network page 604 sent by the conversion data server 136 and rendered at the remote client 103. In accordance with some embodiments, one or more network pages 604 are received at the remote client 103, where a user views the user interface using a web browser 139. In the non-limiting example shown, the user may select one thumbnail from among three video thumbnail 902a, 902b, 902c which already have corresponding conversion data stored in the conversion data server 136. A selection means allows the user to select one or more videos and may comprise check boxes, combo boxes, a drop-down list, radio buttons, a context menu, among other selection controls. The user may also directly click on the video thumbnail to view a 3D video. As described earlier, based on the user's selection, conversion data 116 associated with the selected video is downloaded at the remote client 103, where the 3D video 117 is re-created.

Figure 10:
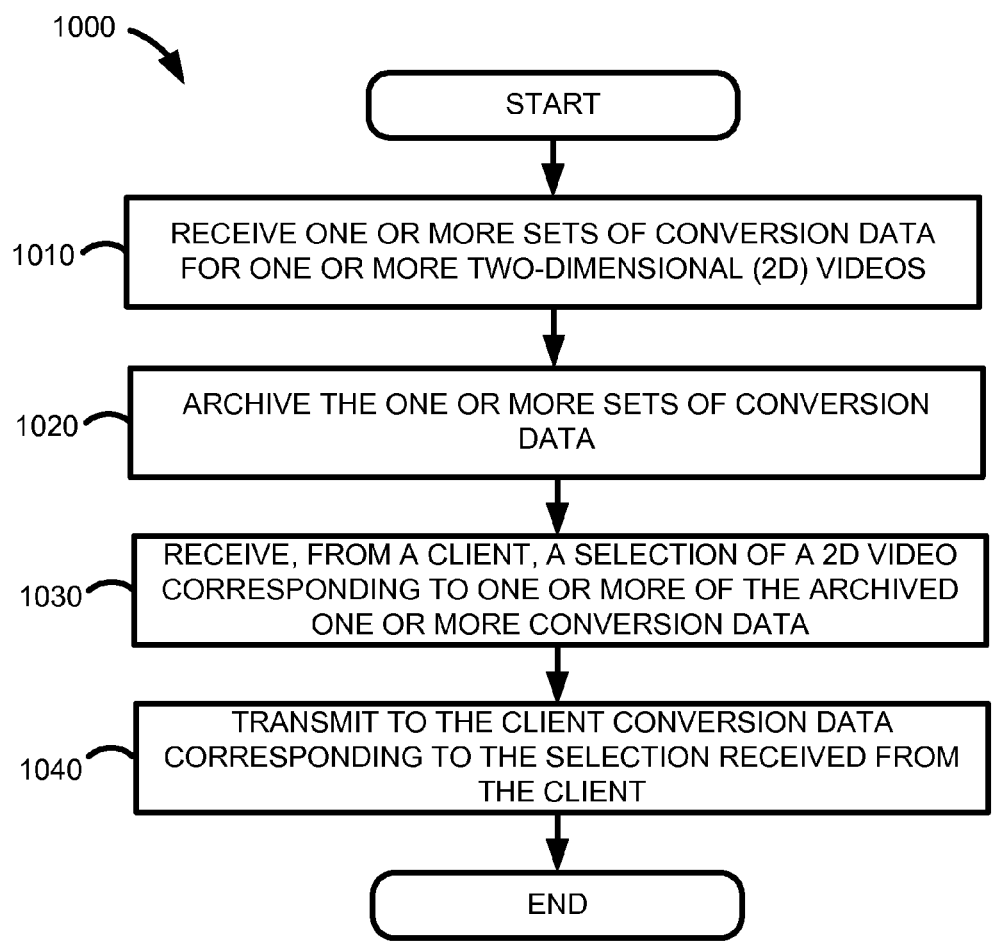
FIG. 10 is a flowchart for sharing conversion data utilizing the components in FIG. 1.

FIG. 10 is a flowchart 1000 for sharing conversion data utilizing the components in FIG. 1. In particular, the flowchart 1000 illustrates a method implemented in the conversion data server 136. Again, if embodied in software, each block depicted in FIG. 10 represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as a processor in a computer system or other system such as the one shown in FIG. 1. The machine code may be converted from the source code, etc. If embodied in hardware, each block may represent a circuit or a number of interconnected circuits to implement the specified logical function(s).

Although the flowchart 1000 of FIG. 10 shows a specific order of execution, it is understood that the order of execution may differ from that which is depicted. Beginning with block 1010, one or more sets of conversion data 116 for one or more two-dimensional (2D) videos 115 are received by the conversion data server 136. In block 1020, the one or more sets of conversion data 116 are archived for future access. As described earlier, for some embodiments, storage location data 602 is also received, and the conversion data 116 and storage location data 602 are stored in a mapping table 642. In block 1030, a selection of a 2D video 115 corresponding to one or more of the archived one or more conversion data is received by the conversion data server 136 from a remote client 103. In block 1040, the client conversion data 116 corresponding to the selection received from the remote client 103 is then transmitted by the conversion data server 136 to the remote client 103.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method, executed by a conversion data server, for sharing video conversion data, comprising:
   receiving, by the conversion data server, conversion data from a first remote client for a two-dimensional (2D) video, wherein the conversion data is generated by a video converter of the first remote client;
   archiving the conversion data at the conversion data server;
   receiving storage location data corresponding to the 2D video from the first remote client at the conversion data server;
   receiving streaming 2D video based on the storage location data and applying the conversion data to the streaming 2D video to generate stereoscopic video at the conversion data server; and
   responsive to a second remote client selecting the same 2D video, transmitting to the second remote client one of: the conversion data and the stereoscopic video.

2. The method of claim 1, further comprising:
   at the first remote client,
      identifying objects in the 2D video;
      determining depth information based on a relationship between the identified objects in the 2D video; and
      generating the conversion data based on the depth information.

3. The method of claim 2, wherein determining depth information is performed by detecting one or more of the following:
   a vanishing point technique based on lines;
   sizes of objects;
   luminance of objects;
   texture gradient of objects;
   motion of the objects;
   a presence of human features;
   placement of objects;
   an object's shadow; and
   occlusive relationships between objects.

4. The method of claim 2, further comprising separating the identified objects and determining relative depth of the identified objects.

5. The method of claim 1, wherein the conversion data and the storage location data for the 2D video are stored in a mapping table at the conversion data server.

6. The method of claim 5, wherein the mapping table further comprises storage location data corresponding to previously-processed 2D videos.

7. The method of claim 6, further comprising receiving, from the second remote client, a selection among the 2D video and the previously-processed 2D videos.

8. The method of claim 1, wherein transmitting to the second remote client the conversion data comprises:
   the second remote client receiving a 2D video specified by the selection; and
   the second remote client applying the conversion data to the 2D video to generate the stereoscopic video.

9. The method of claim 8, wherein applying the conversion data to the 2D video is performed on a frame-by-frame basis.

10. The method of claim 1, wherein the conversion data comprises one of: a depth map, one or more 3D slideshow templates, and non-linear stretch conversion data.

11. A method implemented in a server for sharing video conversion data, comprising:
   receiving one or more sets of conversion data for one or more two-dimensional (2D) videos, wherein the conversion data comprises data previously-generated during conversion of 2D video to three-dimensional (3D) video;
   archiving the one or more sets of conversion data;
   receiving storage location data corresponding to the one or more 2D videos;
   receiving, from a client, a selection of a 2D video corresponding to one or more of the archived one or more conversion data;
   receiving streaming 2D video based on the selected 2D video and the corresponding storage location data;
   applying the conversion data to the streaming 2D video to generate a stereoscopic video; and
   transmitting, to the client, the stereoscopic video corresponding to the selection.

12. The method of claim 11, wherein receiving, from a client, a selection of a 2D video from among the archived one or more 2D videos comprises providing a user interface to the client, wherein the user interface provides the one or more 2D videos which have corresponding conversion data stored in the server.

13. The method of claim 11, wherein providing a user interface to the client comprises one of:
   providing a web page, and
   providing, by a playback application, a user interface.

14. A system for sharing conversion data, comprising:
   a conversion data server comprising:
      a data share application stored on a storage medium and executable in the conversion data server that responds to a selection of a two-dimensional (2D) video, the data share application comprising a user interface generator configured to generate a user interface for receiving the selection of the 2D video from a client; and
      a storage device for storing conversion data corresponding to the 2D video, wherein the conversion data comprises data for conversion of the 2D video to a three-dimensional (3D) video,
      wherein the data share application further comprises a video converter configured to:
         receive storage location data corresponding to the 2D video;
         receive streaming 2D video based on the storage location data;
         apply the stored conversion data to the streaming 2D video to generate the 3D video; and
         transmit the 3D video to a remote client.

15. The system of claim 14, wherein the data share application is configured to receive the conversion data from a video converter of another client, wherein the conversion data is generated based on conversion of the 2D video to the 3D video by the video converter of another client.

16. The system of claim 14, wherein the user interface generator is configured to provide a web page to be displayed at the client.

17. The system of claim 16, wherein the data share application is configured to transmit the conversion data to the client, wherein the client generates the 3D video based on the conversion data.

18. The system of claim 14, wherein the conversion data comprises one or more of: depth map, 3D slideshow templates, object depth information, and non-linear stretch conversion data.

19. The system of claim 14, wherein the storage device further stores storage location data associated with the 2D video.

20. The system of claim 19, wherein the storage location data comprises a uniform resource locator (URL).

21. The system of claim 14, wherein the 2D video is stored on a video sharing server.

22. A method for generating a stereoscopic video, comprising:

generating, by a remote video converter of a first remote client, conversion data for a two-dimensional (2D) video, wherein the video converter of the first remote client receives streaming 2D video from a video sharing server;

receiving, by a conversion data server, a selection of the 2D video from a second remote client;

receiving, by the conversion data server, storage location data corresponding to the 2D video;

receiving streaming 2D video based on the storage location data;

applying, by the conversion data server, the conversion data to the streaming 2D video to generate a 3D video.

23. The method of claim 22, wherein the conversion data is stored in the conversion data server.

24. The method of claim 22, further comprising:

at the video converter of the first remote client,
identifying objects in the 2D video;
determining depth information based on a relationship between the identified objects in the 2D video; and
generating the conversion data based on the depth information.

25. The method of claim 24, wherein determining depth information is performed by detecting one or more of the following:

a vanishing point technique based on lines;
sizes of objects;
luminance of objects;
texture gradient of objects;
motion of the objects;
a presence of human features;
placement of objects;
an object's shadow; and
occlusive relationships between objects.

26. The method of claim 22, further comprising the video converter of the first remote client separating the identified objects and determining relative depth of the identified objects.

27. The method of claim 22, wherein the conversion data and the storage location data for the 2D video are stored in a mapping table at the conversion data server.

28. The method of claim 27, wherein the mapping table further comprises storage location data corresponding to previously-processed 2D videos.

29. The method of claim 22, wherein applying the conversion data to the 2D data is performed on a frame-by-frame basis.

30. The method of claim 22, wherein the conversion data comprises one of: a depth map, one or more 3D slideshow templates, and non-linear stretch conversion data.

31. A method for generating a stereoscopic video, comprising:

generating, by a remote video converter of a first remote client, conversion data for conversion of a two-dimensional (2D) video to the stereoscopic video, wherein the video converter of the first remote client receives streaming 2D video from a video sharing server;

transmitting the previously-generated conversion data to a conversion data server configured to receive selections from a second remote client;

archiving the conversion data at the conversion data server;

receiving storage location data corresponding to the 2D video from the first remote client at the conversion data server;

receiving streaming 2D video based on the storage location data and applying the conversion data to the streaming 2D video to generate stereoscopic video at the conversion data server; and responsive to a second remote client selecting the same 2D video, transmitting the stereoscopic video to the second remote client.

32. The method of claim 5, further comprising: responsive to the conversion data being received by the conversion data server, transmitting the storage location data with the conversion data based on the mapping table.

* * * * *